(12) United States Patent
Chen

(10) Patent No.: US 10,304,169 B2
(45) Date of Patent: May 28, 2019

(54) METHOD AND DEVICE FOR CORRECTION RESTORATION AND ANALYSIS ALARMING OF DISTORTED IMAGE

(71) Applicant: ZTE Corporation, Shenzhen (CN)

(72) Inventor: Bin Chen, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 220 days.

(21) Appl. No.: 15/038,521

(22) PCT Filed: Apr. 15, 2014

(86) PCT No.: PCT/CN2014/075372
§ 371 (c)(1),
(2) Date: May 23, 2016

(87) PCT Pub. No.: WO2014/176971
PCT Pub. Date: Nov. 6, 2014

(65) Prior Publication Data
US 2016/0300334 A1 Oct. 13, 2016

(30) Foreign Application Priority Data
Nov. 22, 2013 (CN) .......................... 2013 1 0598077

(51) Int. Cl.
G06T 5/00 (2006.01)
G06K 9/00 (2006.01)
G06T 3/00 (2006.01)

(52) U.S. Cl.
CPC .......... *G06T 5/006* (2013.01); *G06K 9/00771* (2013.01); *G06T 3/0062* (2013.01);
(Continued)

(58) Field of Classification Search
CPC ................... G06T 5/006; G06T 3/0062; G06T 2207/10016; G06T 2207/10024;
(Continued)

(56) References Cited

U.S. PATENT DOCUMENTS 6,670,965 B1 * 12/2003 McKeown ................ G06T 3/00
345/557
8,446,433 B1 * 5/2013 Mallet ..................... G06T 5/006
345/581

(Continued)

FOREIGN PATENT DOCUMENTS

CN 101625760 A 1/2010
CN 101650830 A 2/2010
(Continued)

OTHER PUBLICATIONS

International Search Report for corresponding application PCT/CN20141075372 filed on Apr. 15, 2014; dated Jun. 25, 2014.
(Continued)

Primary Examiner — Jonathan S Lee
(74) Attorney, Agent, or Firm — Cantor Colburn LLP

(57) ABSTRACT

Provided is a method and device for correction restoration and analysis alarming of a distorted image. The method includes that: an original distorted image acquired by a distortion lens is received, and original distorted coordinates of each coordinate point in the original distorted image are acquired; and pre-stored distortion parameters of the distortion lens are acquired, and restored coordinates of each coordinate point in the original distorted image are determined to obtain a restored image.

17 Claims, 12 Drawing Sheets

(52) U.S. Cl.
CPC ........... *G06T 2207/10016* (2013.01); *G06T 2207/10024* (2013.01); *G06T 2207/20061* (2013.01); *G06T 2207/20081* (2013.01); *G06T 2207/30232* (2013.01)

(58) Field of Classification Search
CPC . G06T 2207/20061; G06T 2207/20081; G06T 2207/30232; G06K 9/00771
See application file for complete search history.

(56) References Cited

U.S. PATENT DOCUMENTS

| | | | | |
|---|---|---|---|---|
| 9,105,090 | B2* | 8/2015 | Haribhatt | G06T 5/006 |
| 9,171,225 | B2* | 10/2015 | Fukaya | G06K 9/46 |
| 9,652,856 | B2* | 5/2017 | Takenaka | G06T 3/4038 |
| 2006/0188172 | A1* | 8/2006 | Higurashi | G06T 5/006 |
| | | | | 382/275 |
| 2008/0101713 | A1* | 5/2008 | Edgar | G06T 3/0018 |
| | | | | 382/260 |
| 2010/0119172 | A1* | 5/2010 | Yu | G06T 3/0018 |
| | | | | 382/256 |
| 2013/0128050 | A1 | 5/2013 | Aghdasi et al. | |

FOREIGN PATENT DOCUMENTS

| | | |
|---|---|---|
| CN | 102194241 A | 9/2011 |
| CN | 102306292 A | 1/2012 |
| CN | 102663734 A | 9/2012 |
| CN | 102902945 A | 1/2013 |
| CN | 103107121 A | 5/2013 |
| CN | 103226814 A | 7/2013 |
| CN | 103279924 A | 9/2013 |

OTHER PUBLICATIONS

Aleman-Flores, et al. "Wide-Angle Lens Distortion Correction Using Division Models": Springer International Publishing, Cham, pp. 415-422; Nov. 20, 2013; XP047268196; ISSN; 0302-9743;ISBN: 978-3-642-02770-3.

Bukhari, et al. "Automatic Radial Distortion Estimation From a Single Image": Journal of Mathermatical Imaging and Vision; vol. 45; No. 1; May 17, 2012; pp. 31-45: XP035155404; ISSN 1573-7683.

Gurtner, et al. "Investigation of Fish-Eye Lenses for Small-UAV Aerial Photography": IEEE Transactions on Geoscience and Remote Sensing; vol. 47; No. 3; Mar. 1, 2009, 2012; pp. 709-721: XP011250695; ISSN 0196-2892.

Supplementary European Search Report Application No. EP14791339; dated Oct. 18, 2016; pp. 7 1-7.

* cited by examiner

METHOD AND DEVICE FOR CORRECTION RESTORATION AND ANALYSIS ALARMING OF DISTORTED IMAGE

TECHNICAL FIELD

The disclosure relates to the technical field of image processing, and in particular to a method and device for correction restoration and analysis alarming of distorted image.

BACKGROUND

In the field of security video monitoring, an ordinary video monitoring probe may have many blind areas and dead angles, which provides opportunities for criminals. If fisheye monitoring probes are pertinently placed in ordinary monitoring blind areas and dead angles for real-time video analysis, a security and rapid early warning function may be well realized for security events, emergencies (such as lost object detection and object monitoring) and the like in these dead angles and blind areas. A fisheye lens is a lens with an extremely short focal distance and a viewing angle approximate or equal to 180°, and it is an extreme wide-angle lens. A front lens of the photographic lens is parabolically protruded from a front part of the lens to reach a maximum photographic viewing angle of the lens, very like a fish eye, so that it is named as a fisheye lens. A fisheye lens is a special lens in ultrawide-angle lenses, and its viewing angle aims to reach or exceed a range reachable for eyes. However, a fisheye lens has the shortcoming that an obtained image is greatly different from a scene of a real world in eyes of people due to the fact that the image is greatly distorted with an extremely large close shot and an extremely small long shot.

SUMMARY

The embodiment of the disclosure provides a method and device for correction restoration and analysis alarming of the distorted image, which may well correct and restore an acquired distorted image.

The embodiment of the disclosure provides a method for correction restoration and analysis alarming of the distorted image, which may include that:

an original distorted image acquired by a distortion lens is received, and original distorted coordinates $(x_d', y_d')$ of each coordinate point in the original distorted image are acquired; and pre-stored distortion parameters $(k_1, k_2)$ of the distortion lens is acquired, and restored coordinates $(x_u', y_u')$ of each coordinate point in the original distorted image are determined to obtain a restored image.

Preferably, a step that the distortion parameters $(k_1, k_2)$ of the distortion lens are calibrated may include that:

a sample image acquired by the distortion lens and a sample image acquired by an ordinary lens are received;

distorted coordinates $(x_d, y_d)$ of a calibration characteristic in the sample image acquired by the distortion lens and undistorted coordinates $(x_u, y_u)$ of a calibration characteristic in the sample image acquired by the ordinary lens are acquired; and the distorted coordinates $(x_d, y_d)$ and the undistorted coordinates $(x_u, y_u)$ are substituted into formula:

$$x_{di} = \frac{x_u}{1 + k_1 r_{i-1}^2 + k_2 r_{i-1}^4}, \quad y_{di} = \frac{y_u}{1 + k_1 r_{i-1}^2 + k_2 r_{i-1}^4},$$

and iteration is performed for n times to obtain the distortion parameters $(k_1, k_2)$, wherein $(x_{di}, y_{di})$ are distorted coordinates after ith iteration, $r_{i-1}$ is a radius of the sample image after (i−1)th iteration, and an initial value is $r_0 = \sqrt{x_u^2 + y_u^2}$.

Preferably, the step that the distorted coordinates $(x_d, y_d)$ of the calibration characteristic in the sample image acquired by the distortion lens and the undistorted coordinates $(x_u, y_u)$ of the calibration characteristic in the sample image acquired by the ordinary lens are acquired may include that:

second-order image graying processing is performed on the sample image acquired by the distortion lens and the sample image acquired by the ordinary lens to obtain a distorted sample grayscale image and an ordinary sample grayscale image respectively;

edge detection is performed on the distorted sample grayscale image and the ordinary sample grayscale image to obtain a distorted sample profile diagram and an ordinary sample profile diagram by adopting an edge detection algorithm respectively; and the calibration characteristics in the distorted sample profile diagram and the ordinary sample profile diagram are detected to obtain the distorted coordinates $(x_d, y_d)$ and the undistorted coordinates $(x_u, y_u)$ by adopting a Hough transform algorithm respectively.

Preferably, the step that the restored coordinates $(x_u', y_u')$ of each coordinate point in the original distorted image are determined may specifically include that:

the original distorted coordinates $(x_d', y_d')$ and the distortion parameters $(k_1, k_2)$ are substituted into formula:

$$x_{di}' = \frac{x_u'}{1 + k_1 r_{i-1}'^2 + k_2 r_{i-1}'^4}, \quad y_{di}' = \frac{y_u'}{1 + k_1 r_{i-1}'^2 + k_2 r_{i-1}'^4},$$

and iteration is performed for n' times to obtain the restored coordinates $(x_u', y_u')$, wherein $(x_{di}', y_{di}')$ are original distorted coordinates after ith iteration, $r_{i-1}'$ is a radius of the original distorted image after (i−1)th iteration, and an initial value is $r_0' = \sqrt{x_u'^2 + y_u'^2}$.

Preferably, after the step that the restored coordinates $(x_u', y_u')$ of each coordinate point in the original distorted image are determined, the method may further include that:

direction angles $(\alpha, \beta, \gamma)$ of the distortion lens are acquired; and spatial position changing is performed on a distorted matrix to obtain restored coordinates $(x_u'', y_u'')$ corresponding to the direction angles $(\alpha, \beta, \gamma)$ of the distortion lens according to the direction angles $(\alpha, \beta, \gamma)$ of the distortion lens and the restored coordinates $(x_u', y_u')$.

Preferably, the step that spatial position changing is performed on the distorted matrix to) obtain the restored coordinates $(x_u'', y_u'')$ corresponding to the direction angles $(\alpha, \beta, \gamma)$ of the distortion lens according to the direction angles $(\alpha, \beta, \gamma)$ of the distortion lens and the restored coordinates $(x_u', y_u')$ may specifically include that:

the restored coordinates $((x_u', y_u')$ are substituted into formula:

$$\begin{bmatrix} x_u' \\ y_u' \end{bmatrix} = \frac{f}{z_c} \begin{bmatrix} x_c \\ y_c \end{bmatrix},$$

to obtain lens coordinates $(x_c, y_c, z_c)$, wherein f is an equivalent focal distance of the distortion lens; and the direction angles ($\alpha$, $\beta$, $\gamma$) and lens coordinates ($x_c$, $y_c$, $z_c$) of the distortion lens are substituted into formula:

$$\begin{bmatrix} x_c \\ y_c \\ z_c \end{bmatrix} = [\alpha\ \beta\ \lambda] \begin{bmatrix} k_1 & k_2 & k_3 \\ k_4 & k_5 & k_6 \\ k_7 & k_8 & k_9 \end{bmatrix} \begin{bmatrix} x_u'' \\ y_u'' \\ z_u'' \end{bmatrix} + \begin{bmatrix} t_x \\ t_y \\ t_z \end{bmatrix}$$

to obtain the restored coordinates ($x_u''$, $y_u''$) corresponding to the direction angles ($\alpha$, $\beta$, $\gamma$) of the distortion lens, wherein $$\begin{bmatrix} k_1 & k_2 & k_3 \\ k_4 & k_5 & k_6 \\ k_7 & k_8 & k_9 \end{bmatrix}$$

is an optical characteristic parameter matrix of the distortion lens, and $$\begin{bmatrix} t_x \\ t_y \\ t_z \end{bmatrix}$$

is a translation vector.

Preferably, after the step that the pre-stored distortion parameters ($k_1$, $k_2$) of the distortion lens are acquired and the restored coordinates ($x_u'$, $y_u'$) of each coordinate point in the original distorted image are determined to obtain the restored image, the method may further include that:

hole coordinate points in the restored image are repaired by adopting an interpolation algorithm; and pixels of the original distorted coordinates are restored to the restored coordinates according to corresponding relationships between the original distorted coordinates of the original distorted image and restored coordinates of the restored image.

After the step that the pre-stored distortion parameters ($k_1$, $k_2$) of the distortion lens are acquired and the restored coordinates ($x_u'$, $y_u'$) of each coordinate point in the original distorted image are determined to obtain the restored image, the method may further include that:

adaptive background learning is performed on multi-frame restored images to obtain a reference background;

segmentation processing is performed on subsequent restored images according to the reference background by adopting an image segmentation algorithm, and a different target characteristic is extracted;

filtering processing is performed on the different target characteristic to exclude a restored image of which the different target characteristic is within a filtering range;

motion matching tracking of the different target characteristic is performed on the subsequent restored images by adopting the different target characteristic out of the filtering range; and when the number of the restored images with the different target characteristic exceeds a preset frame number, the restored images are recorded as images with a sudden change, and an alarm is given.

The embodiment of the disclosure further discloses a device for correction restoration and analysis alarming of the distorted image, which may include:

an acquisition component configured to receive an original distorted image acquired by a distortion lens, and acquire original distorted coordinates ($x_d'$, $y_d'$) of each coordinate point in the original distorted image; and a correction component configured to acquire pre-stored distortion parameters ($k_1$, $k_2$) of the distortion lens, and determine restored coordinates ($x_u'$, $y_u'$) of each coordinate point in the original distorted image to obtain a restored image.

Preferably, the device for correction restoration and analysis alarming of the distorted image may further include a parameter calibration component configured to receive a sample image acquired by the distortion lens and a sample image acquired by an ordinary lens;

acquire distorted coordinates ($x_d$, $y_d$) of a calibration characteristic in the sample image acquired by the distortion lens and undistorted coordinates ($x_u$, $y_u$) of a calibration characteristic in the sample image acquired by the ordinary lens; and substitute the distorted coordinates ($x_d$, $y_d$) and the undistorted coordinates ($x_u$, $y_u$) into formula:

$$x_{di} = \frac{x_u}{1 + k_1 r_{i-1}^2 + k_2 r_{i-1}^4},$$

$$y_{di} = \frac{y_u}{1 + k_1 r_{i-1}^2 + k_2 r_{i-1}^4},$$

and perform iteration for n times to obtain the distortion parameters ($k_1$, $k_2$) where ($x_{di}$, $y_{di}$) are distorted coordinates after ith iteration, $r_{i-1}$ is a radius of the sample image after (i−1)th iteration, and its initial value is $r_0 = \sqrt{x_u^2 + y_u^2}$.

Preferably, the parameter calibration component may further be configured to:

perform second-order image graying processing on the sample image acquired by the distortion lens and the sample image acquired by the ordinary lens to obtain a distorted sample grayscale image and an ordinary sample grayscale image respectively;

perform edge detection on the distorted sample grayscale image and the ordinary sample grayscale image to obtain a distorted sample profile diagram and an ordinary sample profile diagram by adopting an edge detection algorithm respectively; and detect the calibration characteristics in the distorted sample profile diagram and the ordinary sample profile diagram to obtain the distorted coordinates ($x_d$, $y_d$) and the undistorted coordinates ($x_u$, $y_u$) by adopting a Hough transform algorithm respectively. Preferably, the correction component may further be configured to:

substitute the original distorted coordinates ($x_d'$, $y_d'$) and the distortion parameters ($k_1$, $k_2$) into formula:

$$x_{di}' = \frac{x_u'}{1 + k_1 r_{i-1}'^2 + k_2 r_{i-1}'^4},$$

$$y_{di}' = \frac{y_u'}{1 + k_1 r_{i-1}'^2 + k_2 r_{i-1}'^4},$$

and perform iteration for n' times to obtain the restored coordinates ($x_u'$, $y_u'$), wherein ($x_{di}'$, $y_{di}'$) are original distorted coordinate after ith iteration, $r_{i-1}'$ is a radius of the original distorted image after (i−1)th iteration, and an initial value is $r_0' = \sqrt{x_u'^2 + y_u'^2}$.

Preferably, the acquisition component may further be configured to acquire direction angles ($\alpha$, $\beta$, $\gamma$) of the distortion lens; and the correction component may further be configured to perform spatial position changing) on a distorted matrix to obtain restored coordinates ($x_u''$, $y_u''$) corresponding to the direction angle ($\alpha$, $\beta$, $\gamma$) of the distortion lens according to the direction angles ($\alpha$, $\beta$, $\gamma$) of the distortion lens and the restored coordinates ($x_u'$, $y_u'$).

Preferably, the correction component may further be configured to:

substitute the restored coordinates ($x_u'$, $y_u'$) into formula $$\begin{bmatrix} x_u' \\ y_u' \end{bmatrix} = \frac{f}{z_c}\begin{bmatrix} x_c \\ y_c \end{bmatrix}$$

to obtain lens coordinates ($x_c$, $y_c$, $z_c$), wherein f is an equivalent focal distance of the distortion lens; and substitute the direction angles ($\alpha$, $\beta$, $\gamma$) and lens coordinates ($x_c$, $y_c$, $z_c$) of the distortion lens into formula $$\begin{bmatrix} x_c \\ y_c \\ z_c \end{bmatrix} = \begin{bmatrix} \alpha & \beta & \lambda \end{bmatrix}\begin{bmatrix} k_1 & k_2 & k_3 \\ k_4 & k_5 & k_6 \\ k_7 & k_8 & k_9 \end{bmatrix}\begin{bmatrix} x_u'' \\ y_u'' \\ z_u'' \end{bmatrix} + \begin{bmatrix} t_x \\ t_y \\ t_z \end{bmatrix}$$

to obtain the restored coordinates ($x_u''$, $y_u''$) corresponding to the direction angles ($\alpha$, $\beta$, $\gamma$) of the distortion lens, wherein $$\begin{bmatrix} k_1 & k_2 & k_3 \\ k_4 & k_5 & k_6 \\ k_7 & k_8 & k_9 \end{bmatrix}$$

is an optical characteristic parameter matrix of the distortion lens, and $$\begin{bmatrix} t_x \\ t_y \\ t_z \end{bmatrix}$$

is a translation vector.

Preferably, the device for correction restoration and analysis alarming of the distorted image may further include:

a repair component configured to repair hole coordinate points in the restored image by adopting an interpolation algorithm; and a pixel restoration component configured to restore pixels of the original distorted coordinates to the restored coordinates according to corresponding relationships between original distorted coordinates of the original distorted image and restored coordinates of the restored image.

Preferably, the device for correction restoration and analysis alarming of the distorted image may further include an alarming analysis component configured to:

perform adaptive background learning on multi-frame image restored to obtain a reference background;

perform segmentation processing on subsequent restored images according to the reference background by adopting an image segmentation algorithm, and extract a different target characteristic;

perform filtering processing on the different target characteristic to exclude a restored image of which the different target characteristic is within a filtering range;

perform motion matching tracking of the different target characteristic on the subsequent restored images by adopting the different target characteristic out of the filtering range; and when the number of restored images with the different target characteristic exceeds a preset frame number, record the restored images as images with a sudden change, and give an alarm.

According to the embodiment of the disclosure, correction restoration processing is performed on the image acquired by the distortion lens to obtain an undistorted image by adopting the pre-stored distortion parameters of the distortion lens, so that a displayed picture is approximate to a real scene; and moreover, the restored image has the characteristic of large viewing angle, so that blind areas and dead angles of shooting at an ordinary viewing angle are avoided, capturing of an emergency in a security monitoring environment is facilitated, and security alarming accuracy is improved.

Implementation, function characteristics and advantages of the embodiment of the disclosure are further described with reference to embodiments and the drawings.

DETAILED DESCRIPTION OF THE EMBODIMENTS

It should be understood that specific embodiments described here are only adopted to explain the disclosure and not intended to limit the disclosure.

Figure 1:
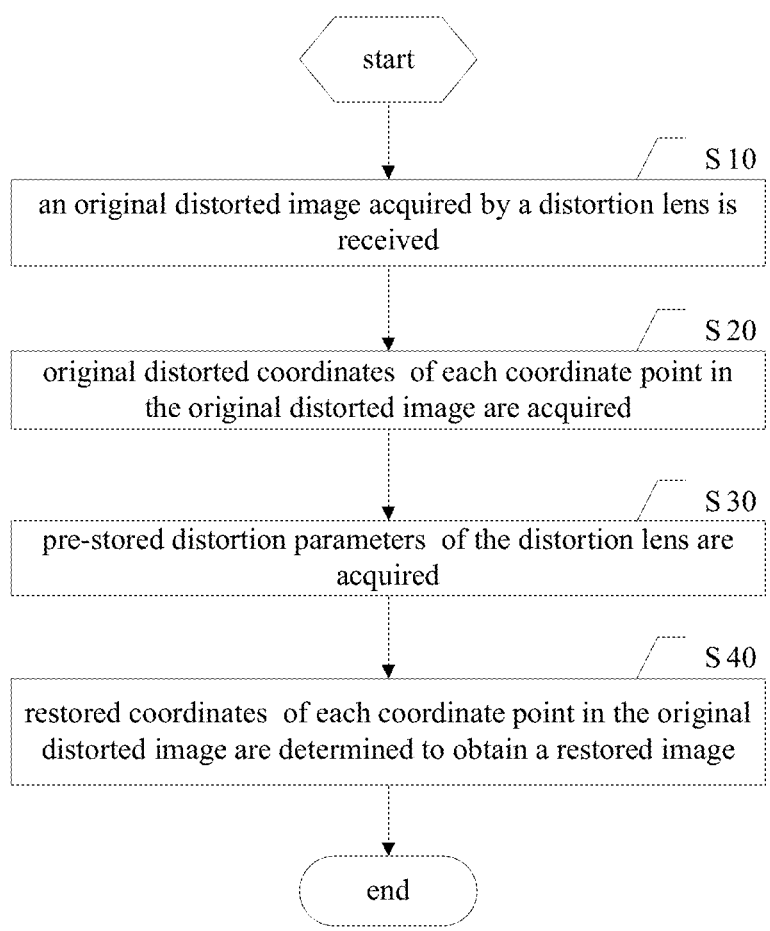
FIG. 1 shows a flowchart of a method for correction restoration and analysis alarming of the distorted image according to a first embodiment of the disclosure.

FIG. 1 shows a flowchart of a method for correction restoration and analysis alarming of the distorted image according to a first embodiment of the disclosure, and as shown in FIG. 1, the method for correction restoration and analysis alarming of the distorted image in the embodiment includes:

Step 10: an original distorted image acquired by a distortion lens is received.

The present embodiment relates to the technical field of security. In the embodiment, a monitoring video is acquired through a camera of a fisheye lens (i.e. the distortion lens) and the camera of the fisheye lens is connected with equipment with a distorted image correction restoration device. The equipment with the distorted image correction restoration device may be intelligent equipment such as an ordinary computer and a mobile phone, or is dedicated equipment adapted to the fisheye lens, and the camera is directly connected with a monitoring center, or is connected with the monitoring center through the equipment with the distorted image correction restoration device. The camera of the fisheye lens transmits shot video data to the computer or the dedicated equipment through a data cable, or transmits the video data to the mobile phone or the monitoring center in a wireless transmission manner, or transmits analyzed data to the monitoring center through the computer, the mobile phone, the dedicated equipment and the like.

Step 20: original distorted coordinates $(x_d', y_d')$ of each coordinate point in the original distorted image are acquired.

Each coordinate point in the original distorted image may be a position coordinate, and may also be a pixel coordinate. When the coordinates are acquired, the original distorted image may be converted into a grayscale image for correction processing.

Step 30: pre-stored distortion parameters $(k_1, k_2)$ of the distortion lens are acquired.

The distortion parameters of the distortion lens in lens parameters are pre-stored, a distortion degree is higher if absolute values of $k_1$ and $k_2$ are greater, and when $k_1$ and $k_2$ are both more than 0, it is indicated that four corners of the image are distorted towards the center.

Step 40: restored coordinates $(x_u', y_u')$ of each coordinate point in the original distorted image are determined to obtain a restored image.

The distortion parameters are adopted to restore the original distorted image so as to obtain an undistorted image with a large viewing angle and a corresponding video stream. The viewing angle of the corrected image is much larger than a viewing angle of an image obtained by an ordinary lens, so that the problem of blind areas and dead angles of ordinary monitoring may be solved. In addition, the equipment with the distorted image correction restoration device may also be connected with an alarming system, analysis processing is performed on the restored images to judge whether there is an abnormal emergency in the restored images or not, and if an emergency happens and the number of frames where the emergency is recorded continuously exceeds a certain number, that is, the emergency exists in multi-frame images restored, the emergency is captured, that is, the restored images are recorded, and an alarm notice is synchronously sent to implement automatic alarming.

In the embodiment, correction restoration processing is performed, according to the pre-stored distortion parameters of the distortion lens, on the image acquired by the distortion lens to obtain the undistorted image, so that a displayed picture is approximate to a real scene; and moreover, the restored image has the characteristic of large viewing angle, so that blind areas and dead angles of shooting at an ordinary viewing angle are avoided, capturing of an emergency in a security monitoring environment is facilitated, and security alarming accuracy is improved.

Figure 2:
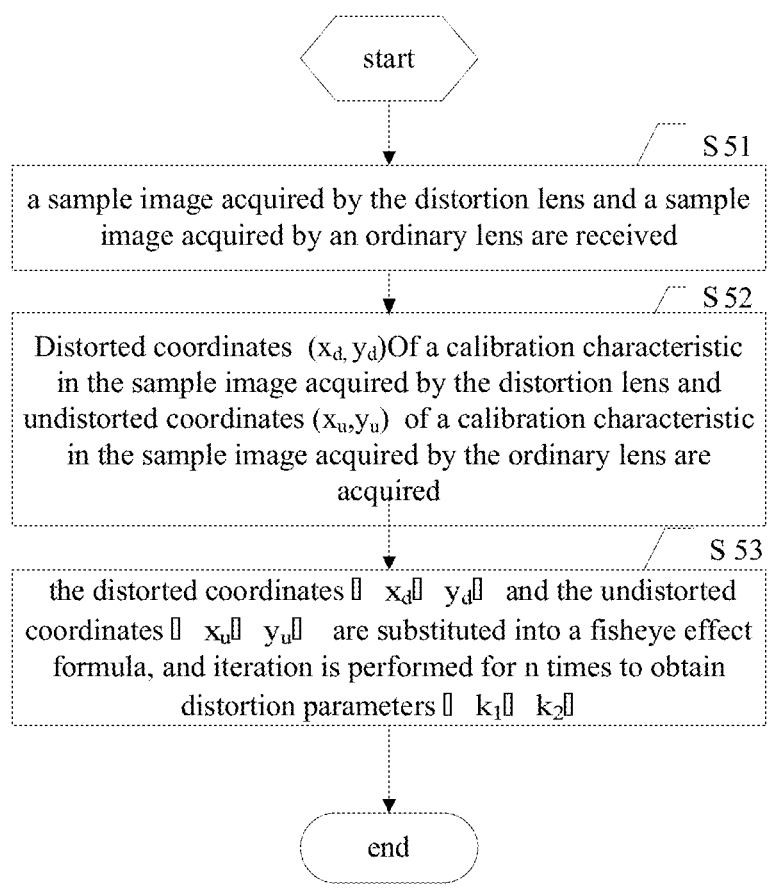
FIG. 2 shows a flowchart of a method for correction restoration and analysis alarming of the distorted image according to a second embodiment of the disclosure.

FIG. 2 shows a flowchart of a method for correction restoration and analysis alarming of the distorted image according to a second embodiment of the disclosure. As shown in FIG. 2, a step that distortion parameters $(k_1, k_2)$ of the distortion lens are calibrated in the embodiment shown in FIG. 1 is described in the embodiment, wherein the step that the distortion parameters $(k_1, k_2)$ are calibrated includes:

Step 51: a sample image acquired by the distortion lens and a sample image acquired by an ordinary lens are received.

Figure 12:
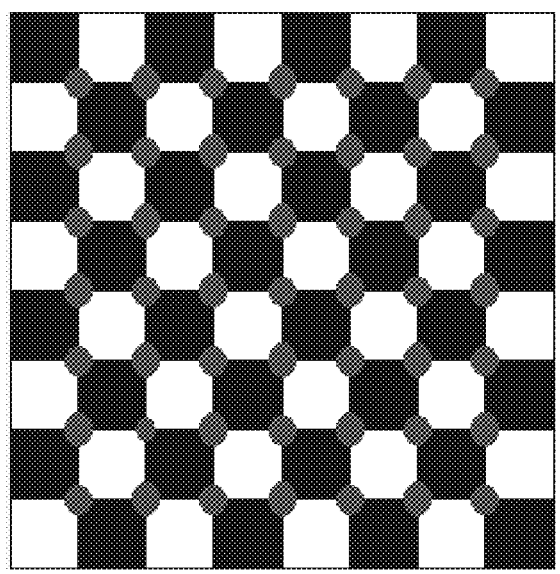
FIG. 12 shows a diagram of a checker sample according to an embodiment of the disclosure.

In the embodiment, when the distortion parameters are calibrated, the sample image is preselected, and calibration characteristics are marked in the sample image. For example, in a checker shown in FIG. 12, intersected corners of the checker are marked with solid circles with the same radius, circle center coordinates (x,y,z) calibrated are pre-measured, and circle centers of the solid circles are determined as calibration characteristics of the sample. The sample images are shot by the fisheye lens (i.e. the distortion lens) and the ordinary lens respectively. The shot sample images shot by the fisheye lens and the ordinary lens respectively are sent to the distorted image correction restoration device.

Step 52: distorted coordinates $(x_d, y_d)$ of a calibration characteristic in the sample image acquired by the distortion lens and undistorted coordinates $(x_u, y_u)$ of a calibration characteristic in the sample image acquired by the ordinary lens are acquired.

Identification processing is performed on the calibration characteristics in the sample images acquired by the distortion lens and the ordinary lens. For example, in the checker shown in FIG. 12, the solid circles in the checker are identified, the circle centers of the solid circles are identified, and coordinate values of the circle centers of the solid circles are determined. A table showing the corresponding relationships between sample characteristics is constructed according to a corresponding relationship among practical spatial position coordinates (x,y,z) of a circle center of a sample, distorted coordinates $(x_d, y_d)$ acquired by the distortion lens and undistorted coordinates $(x_u, y_u)$ acquired by the ordinary lens, shown as the following table:

| | Attribute | | | | | | |
|---|---|---|---|---|---|---|---|
| | Practical spatial coordinates | | | Undistorted coordinates | | Distorted coordinates | |
| Sequence number | x | y | z | $x_u$ | $y_u$ | $x_d$ | $y_d$ |
| 1 | | | | | | | |
| 2 | | | | | | | |
| ... | | | | | | | |
| N | | | | | | | |

If only radial distortion of the lens is considered in the embodiment, projection coordinates of distorted calibration characteristic point are $(x_d, y_d)$.

In the embodiment, the coordinates of the calibration characteristics may be determined in a manner as follows: first, second-order image graying processing is performed on the sample image acquired by the distortion lens and the sample image acquired by the ordinary lens to obtain a distorted sample grayscale image and an ordinary sample grayscale image respectively; then, edge detection is performed on the distorted sample grayscale image and the ordinary sample grayscale image to obtain a distorted sample profile diagram and an ordinary sample profile diagram by adopting an edge detection algorithm respectively; and finally, the calibration characteristics in the distorted sample profile diagram and the ordinary sample profile diagram are detected to obtain the distorted coordinates $(x_d, y_d)$ and the undistorted coordinates $(x_u, y_u)$ by adopting a Hough transform algorithm respectively.

Step 53: the distorted coordinates and $(x_d, y_d)$ and the undistorted coordinates $(x_u, y_u)$ are substituted into formula:

$$x_{di} = \frac{x_u}{1 + k_1 r_{i-1}^2 + k_2 r_{i-1}^4},$$

$$y_{di} = \frac{y_u}{1 + k_1 r_{i-1}^2 + k_2 r_{i-1}^4},$$

and iteration is performed for n times to obtain the distortion parameters $(k_1, k_2)$.

Figure 13:
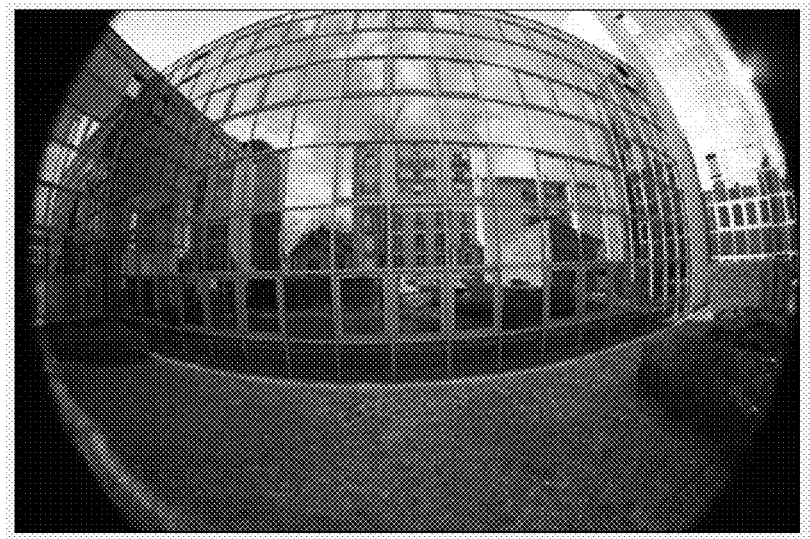
FIG. 13 shows an original distorted image acquired by a distortion lens according to an embodiment of the disclosure.

The above formula may be called a fisheye effect equation, wherein $(x_{di}, y_{di})$ are distorted coordinates after ith iteration, the image shot by the distortion lens is shown in FIG. 13, $r_{i-1}$ is a radius of the sample image after (i−1)th iteration, and its initial value is $r_0 = \sqrt{x_u^2 + y_u^2}$. The number of iteration times may be preset, and iteration may usually be performed for 5 to 6 times. After iteration is performed for many times, the distortion parameters $(k_1, k_2)$ may be solved, and the obtained distortion parameters are stored in the memory for the lens parameters.

In the embodiment, the distortion parameters of the distortion lens are obtained by adopting the fisheye effect equation, and when the subsequent distorted images are corrected, the image acquired by the distortion lens is restored through the distortion parameters to obtain the undistorted image, so that the displayed picture is approximate to the real scene, capturing of the emergency in the security monitoring environment is facilitated, and security alarming accuracy is improved.

Figure 3:
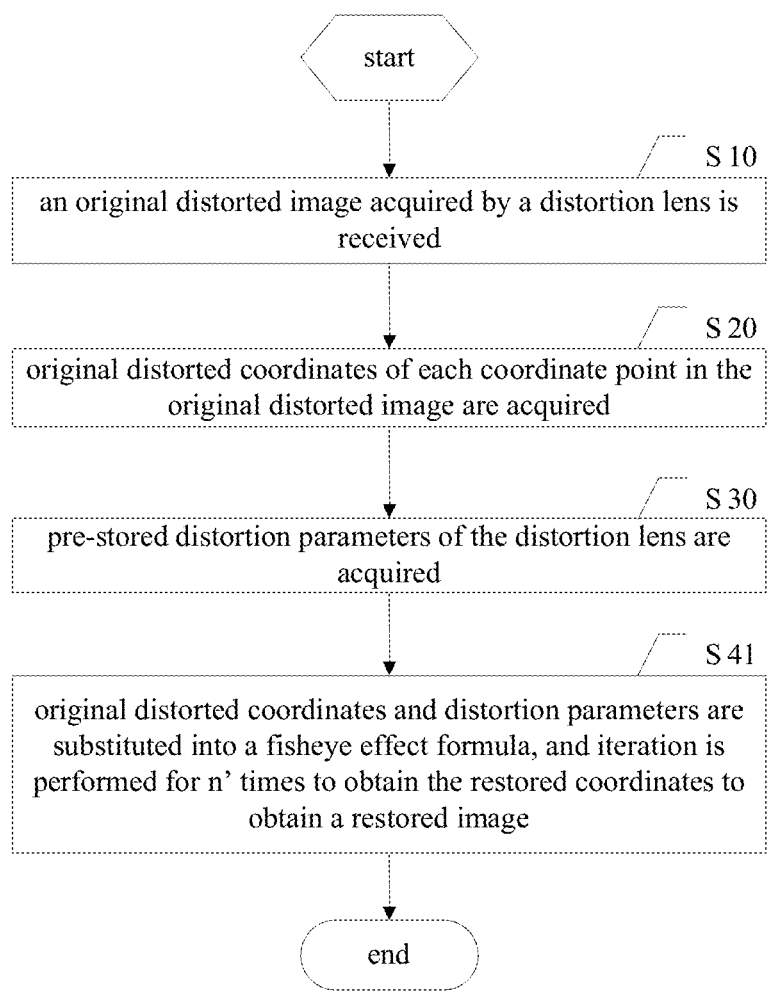
FIG. 3 shows a flowchart of a method for correction restoration and analysis alarming of the distorted image according to a third embodiment of the disclosure.

FIG. 3 is a flowchart of a method for correction restoration and analysis alarming of the distorted image according to a third embodiment of the disclosure, and as shown in FIG. 3, Step 40 in the embodiment, based on the embodiment shown in FIG. 1, specifically includes:

Step 41: the original distorted coordinates $(x_d', y_d')$ and the distortion parameters $(k_1, k_2)$ are substituted into formula:

$$x_{di}' = \frac{x_u'}{1 + k_1 r_{i-1}'^2 + k_2 r_{i-1}'^4},$$

$$y_{di}' = \frac{y_u'}{1 + k_1 r_{i-1}'^2 + k_2 r_{i-1}'^4},$$

and iteration is performed for n' times to obtain the restored coordinates $(x_u', y_u')$ and the restored image.

$(x_{di}', y_{di}')$ are original distorted coordinates after ith iteration, $r_{i-1}'$ is a radius of the original distorted image after (i−1)th iteration, and its initial value is $r_0' = \sqrt{x_u'^2 + y_u'^2}$.

In the embodiment, each coordinate point in the original distorted image is corrected to determine the restored coordinates by adopting a reverse process of the fisheye effect equation, the image is reconstructed to obtain the restored image according to the restored coordinates, the restored image is undistorted, and the displayed picture is approximate to the real scene, so that capturing of the emergency in the security monitoring environment is facilitated, and security alarming accuracy is improved.

Figure 4:
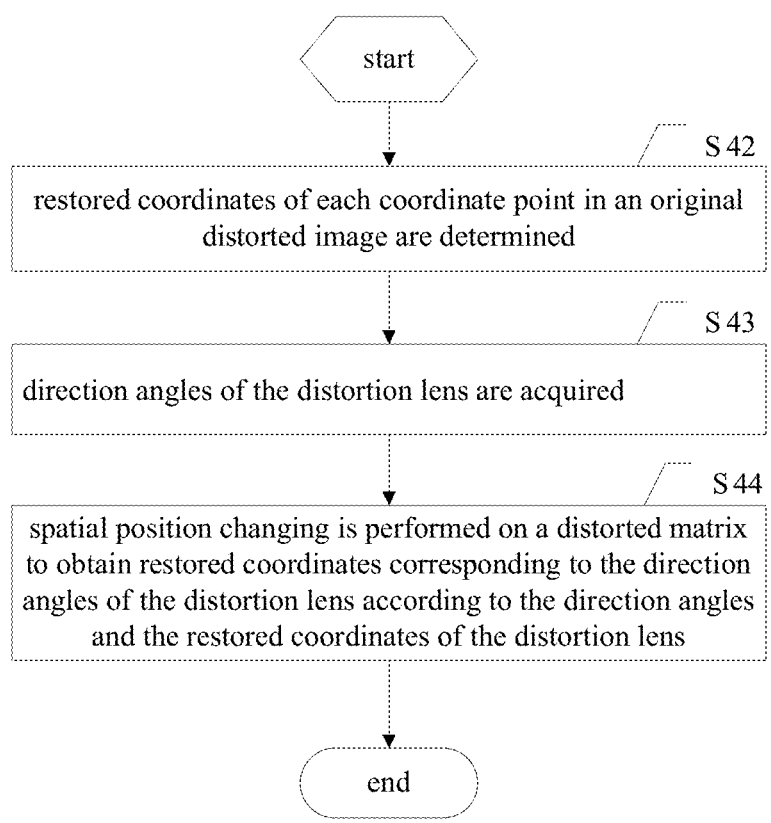
FIG. 4 shows a flowchart of a method for correction restoration and analysis alarming of the distorted image according to a fourth embodiment of the disclosure.

FIG. 4 is a flowchart of a method for correction restoration and analysis alarming of the distorted image according to a fourth embodiment of the disclosure, and as shown in FIG. 4, Step 40 in the embodiment, based on the embodiment shown in FIG. 1, further specifically includes:

Step 42: the restored coordinates $(x_u', y_u')$ of each coordinate point in the original distorted image are determined;

Step 43: direction angles $(\alpha, \beta, \gamma)$ of the distortion lens are acquired; and Step 44: spatial position changing is performed on a distorted matrix to obtain restored coordinates $(x_u'', y_u'')$ corresponding to the direction angles $(\alpha, \beta, \gamma)$ of the distortion lens according to the direction angles $(\alpha, \beta, \gamma)$ of the distortion lens and the restored coordinates $(x_u', y_u')$, and to obtain the restored image.

In the embodiment, considering that the coordinates obtained after the image is restored may have an angular offset with practical coordinates when the direction angles of the distortion lens with the pre-stored distortion parameters during calibration of the distortion parameters is inconsistent with a direction angle during practical image acquisition, it is necessary to perform spatial position changing on the distorted matrix to obtain the restored coordinates corresponding to the current direction angles to make the obtained restored image more approximate to the real image, so that reality of the displayed picture and emergency capturing accuracy in the security monitoring environment are further improved.

Figure 5:
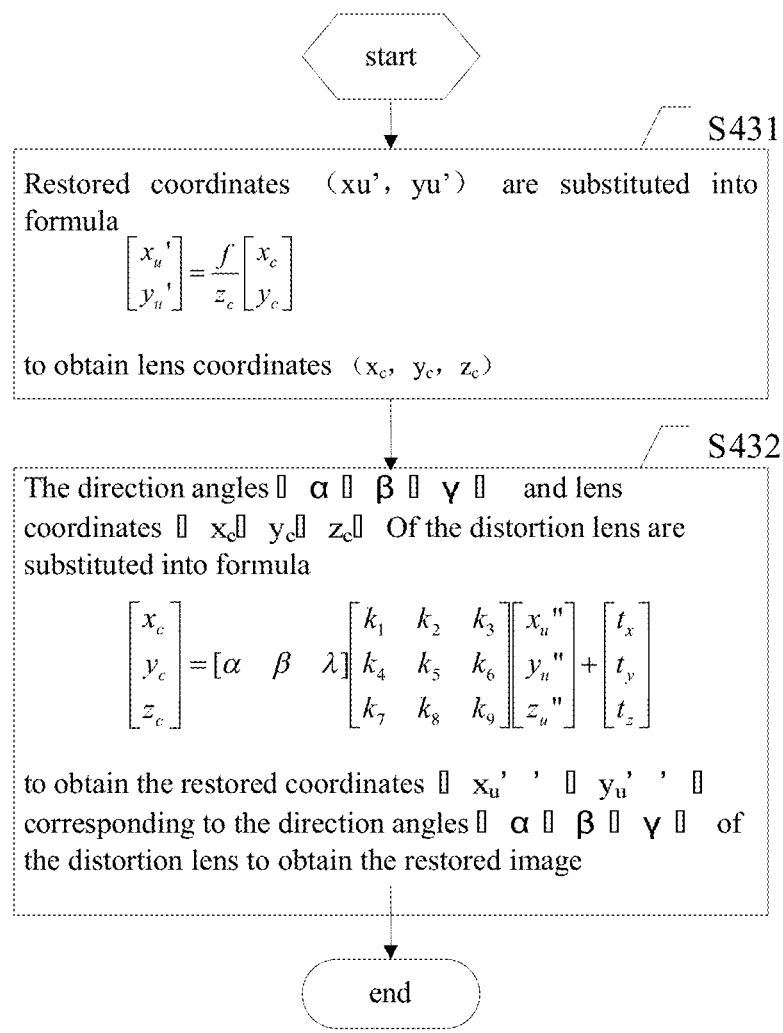
FIG. 5 shows a flowchart of a method for correction restoration and analysis alarming of the distorted image according to a fifth embodiment of the disclosure.

FIG. 5 shows a flowchart of a method for correction restoration and analysis alarming of the distorted image according to a fifth embodiment of the disclosure, and as shown in FIG. 5, Step 43 in the embodiment, based on the embodiment shown in FIG. 4, specifically includes:

Step 431: the restored coordinates $(x_u', y_u')$ are substituted into formula:

$$\begin{bmatrix} x_u' \\ y_u' \end{bmatrix} = \frac{f}{z_c} \begin{bmatrix} x_c \\ y_c \end{bmatrix}$$

to obtain lens coordinates $(x_c, y_c, z_c)$.

In the embodiment, the coordinates $(x_c, y_c, z_c)$ are obtained by a reverse process of perspective transform, and the coordinates are coordinate values before perspective transform, wherein f is an equivalent focal distance of the distortion lens.

Step 432: the direction angles $(\alpha, \beta, \gamma)$ and lens coordinates $(x_c, y_c, z_c)$ of the distortion lens are substituted into formula:

$$\begin{bmatrix} x_c \\ y_c \\ z_c \end{bmatrix} = [\alpha \ \beta \ \lambda] \begin{bmatrix} k_1 & k_2 & k_3 \\ k_4 & k_5 & k_6 \\ k_7 & k_8 & k_9 \end{bmatrix} \begin{bmatrix} x_u'' \\ y_u'' \\ z_u'' \end{bmatrix} + \begin{bmatrix} t_x \\ t_y \\ t_z \end{bmatrix}$$

to obtain the restored coordinates ($x_u''$, $y_u''$) corresponding to the direction angles ($\alpha$, $\beta$, $\gamma$) of the distortion lens to obtain the restored image.

According to a mathematical model of a space imaging system, the restored coordinates ($x_u''$, $y_u''$, $z_u''$) are mapped into the coordinates ($x_c$, $y_c$, $z_c$) before perspective transform after rotation and translation transform, so that the restored coordinates ($x_u''$, $y_u''$, $z_u''$) corresponding to the direction angles ($\alpha$, $\beta$, $\gamma$) of the distortion lens may be obtained by the reverse process, wherein $$\begin{bmatrix} k_1 & k_2 & k_3 \\ k_4 & k_5 & k_6 \\ k_7 & k_8 & k_9 \end{bmatrix}$$

is an optical characteristic parameter matrix of the distortion lens, and $$\begin{bmatrix} t_x \\ t_y \\ t_z \end{bmatrix}$$

is a translation vector. In the embodiment, it is supposed that only radial distortion of the lens is considered, so that $z_u''$ may be 0, and the image is reconstructed to obtain the restored image according to the obtained restored coordinates ($x_u''$, $y_u''$).

In the embodiment, spatial position changing is performed on the distorted matrix to obtain the restored coordinates corresponding to the current direction angles to make the obtained restored image more approximate to the real image, so that reality of the displayed picture and emergency capturing accuracy in the security monitoring environment are further improved.

Figure 6:
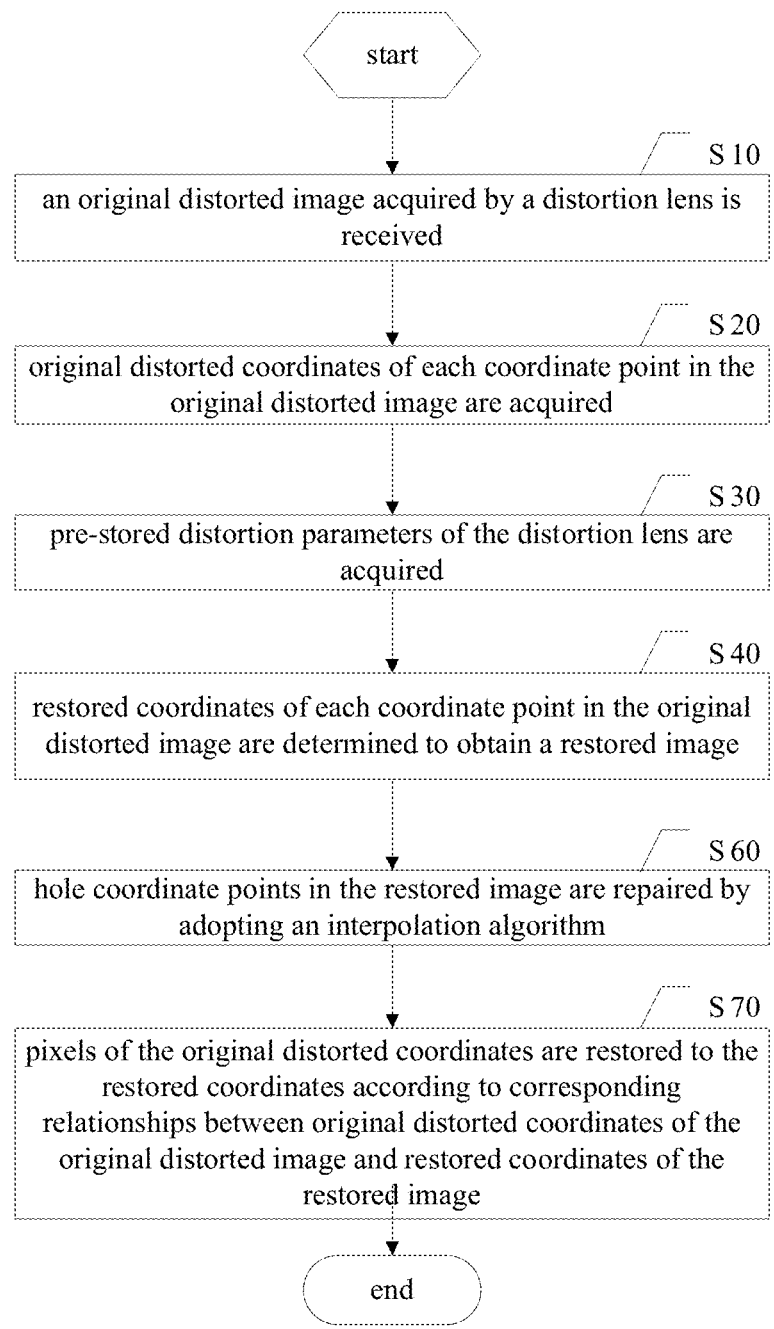
FIG. 6 shows a flowchart of a method for correction restoration and analysis alarming of the distorted image according to a sixth embodiment of the disclosure.

FIG. 6 shows a flowchart of a method for correction restoration and analysis alarming of the distorted image according to a sixth embodiment of the disclosure, and as shown in FIG. 6, after Step 40, the embodiment, based on the embodiment shown in FIG. 1, further includes:

Step 60: hole coordinate points in the restored image are repaired by adopting an interpolation algorithm.

Figure 14:
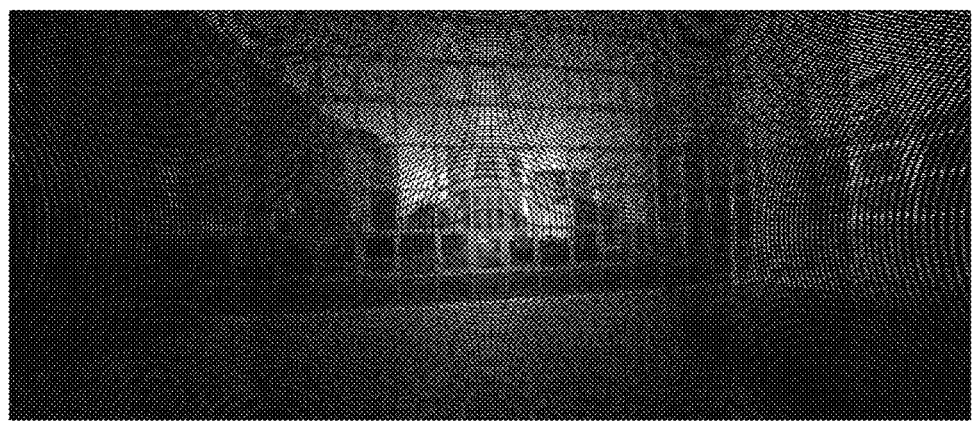
FIG. 14 shows a restored image with holes according to an embodiment of the disclosure.
Figure 15:
FIG. 15 shows a restored image of which holes are repaired according to an embodiment of the disclosure.

In the embodiment, there may exist some black grids, which may be called holes, in the restored image after distortion correction, as shown in FIG. 14. For finally obtaining a complete image, the holes are required to be repaired, and the holes are repaired to restore an undistorted large-viewing-angle image by adopting the interpolation algorithm, as shown in FIG. 15.

Step 70: pixels of the original distorted coordinates are restored to the restored coordinates according to a corresponding relationship between original distorted coordinates of the original distorted image and restored coordinates of the restored image.

In addition, a color image is originally obtained during image shooting, the color image is converted into a gray-scale image to extract the original distorted coordinates, and it is necessary to perform color restoration to restore the pixels of the original distorted coordinates to the restored coordinates to finally obtain the color-restored image, so that capturing of the emergency in the security monitoring environment is facilitated, and alarming accuracy is further improved.

Figure 7:
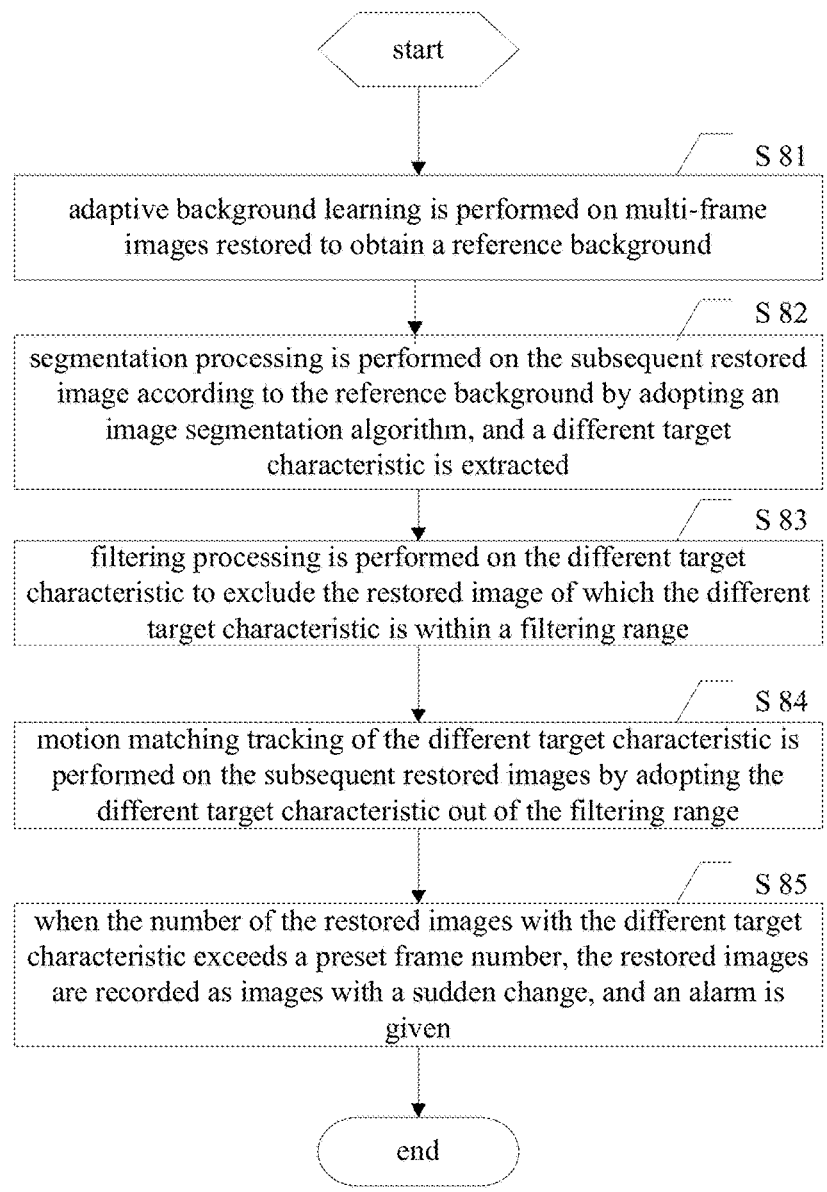
FIG. 7 shows a flowchart of a method for correction restoration and analysis alarming of the distorted image according to an eighth embodiment of the disclosure.

FIG. 7 is a flowchart of a method for correction restoration and analysis alarming of the distorted image according to an eighth embodiment of the disclosure. As shown in FIG. 7, a specific analysis alarming step is added in the embodiment, and by the step, the restored image may be analyzed after Step 40 in the embodiment shown in FIG. 1, and the image subjected to hole repair and color restoration may also be analyzed after Step 70 in the embodiment shown in FIG. 6. For example, after Step 40, the embodiment includes:

Step 81: adaptive background learning is performed on multi-frame images restored to obtain a reference background.

In the embodiment, adaptive background learning is performed on multi-frame of images restored and video, and the reference background without any emergency is extracted. Adaptive background learning may be reference background extraction over the first n-frame images within a time period. For example, for the images during the first hour, i.e. the images within 0-60 minutes, adaptive learning is performed on the images during the first 0-5 minutes to extract the reference background, then the reference background is compared with the images during the 6th-60th minutes; and for the images during the second hour, i.e. the images within 60-120 minutes, adaptive learning is performed on the images during 60th-65th minutes to extract the reference background, then the reference background is compared with the images during the 66th-120th minutes, and so on.

Step 82: segmentation processing is performed on the subsequent restored images according to the reference background by adopting an image segmentation algorithm, and a different target characteristic is extracted.

When the reference background is compared with the subsequent images for analysis, a background image the same as or similar to the reference background and a foreground image greatly different from the reference background are segmented by adopting the image segmentation algorithm, and the different target characteristic is extracted from the foreground image. For example, there is one more person in a certain subsequent image compared with the reference background, and an image of the person is determined as a different target characteristic; and for another example, there is a box in the reference background, there is no box in a certain subsequent image, and then a position where the box is placed is determined as a different target characteristic.

Step 83: filtering processing is performed on the different target characteristic to exclude the restored image of which the different target characteristic is within a filtering range.

In consideration of influence of video noise caused by light and shadow or signal acquisition, the filtering range is preset to filter the different target characteristic caused by noise to exclude the image which is differentiated by noise.

Step 84: motion matching tracking of the different target characteristic is performed on the subsequent restored images by adopting the different target characteristic out of the filtering range.

For the different target characteristic out of the filtering range, it may be an emergency, and the subsequent images are matched and tracked to judge whether the different target characteristic still exists in the subsequent images or not. For example, an image of a person appears on a right side of the ith-frame image, motion matching tracking is performed on the image of the person in each image within a certain time period, and the image of the person gradually moves leftwards. For another example, there is a box in middle of the first to (i−1)th-frame image, there is no box in the ith-frame image, there is no box all the time in each image within a certain time period, or a position of the box changes in the ith-frame image, and the box continuously moves in each image within the time period.

Step 85: when the number of the restored images with the different target characteristic exceeds a preset frame number, the restored images are recorded as images with a sudden change, and an alarm is given.

In order to exclude some accidental interference conditions, for example, a person passes by in a monitoring range, an image of the person may not exist for a long time in a video picture, and may fast move out of the picture within a specified time length. The number of frames within 2 seconds is determined as the preset frame number if the image of the person exists in the video picture for 2 seconds when the person passes by. It is determined as a normal condition and alarming is not required if the image of the person appears within the preset frame number, and if the image of the person continuously appears out of a range of the preset frame number, it is indicated that the person appears for long in a monitoring area, there may be an abnormity and alarming is required. For another example, a box suddenly disappears from the monitoring range, if the box reappears in the image after 0.5 second, accidental interference is determined and alarming is not required, and if the box does not appear for more than 5 seconds, it may be considered as an abnormity, and an alarm notice is required to be sent to implement automatic alarming.

According to the embodiment, an intelligent analysis alarming object is the corrected and restored image of the distorted image acquired by the fisheye lens, and the obtained image has the characteristic of large viewing angle compared with the image acquired by the ordinary lens, so that the problem of blind areas and dead angles of ordinary monitoring may be solved, capturing of the emergency in the security monitoring environment is facilitated, and security alarming accuracy is improved.

Figure 8:
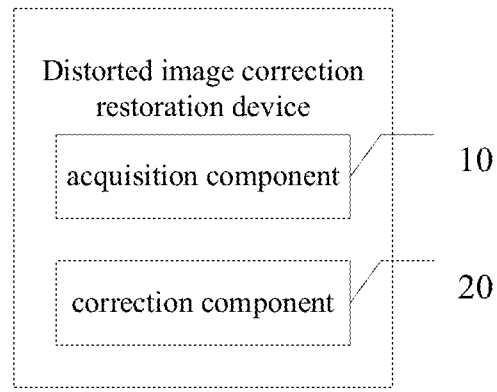
FIG. 8 shows a structure diagram of a device for correction restoration and analysis alarming of the distorted image according to a first embodiment of the disclosure.

FIG. 8 is a structure diagram of a device for correction restoration and analysis alarming of the distorted image according to a first embodiment of the disclosure, and as shown in FIG. 8, the device for correction restoration and analysis alarming of the distorted image in the embodiment includes:

an acquisition component 10 configured to receive an original distorted image acquired) by a distortion lens, and acquire original distorted coordinates ($x_d'$, $y_d'$) of each coordinate point in the original distorted image; and a correction component 20 configured to acquire pre-stored distortion parameters ($k_1$, $k_2$) of the distortion lens, and determine restored coordinates ($x_u'$, $y_u'$) of each coordinate point in the original distorted image to obtain a restored image The present embodiment relates to the technical field of security. In the embodiment, a monitoring video is acquired through a camera of a fisheye lens (i.e. the distortion lens), and the camera of the fisheye lens is connected with equipment with a distorted image correction restoration device. The equipment with the distorted image correction restoration device may be intelligent equipment such as an ordinary computer and a mobile phone, or is dedicated equipment adapted to the fisheye lens, and the camera is directly connected with a monitoring center, or is connected with the monitoring center through the equipment with the distorted image correction restoration device. The camera of the fisheye lens transmits shot video data to the computer or the dedicated equipment through a data cable, or transmits the video data to the mobile phone or the monitoring center in a wireless transmission manner, or transmits analyzed data to the monitoring center through the computer, the mobile phone, the dedicated equipment and the like. Each coordinate point in the original distorted image may be a position coordinate, and may also be a pixel coordinate. When the coordinates are acquired, the original distorted image may be converted into a grayscale image for correction processing. The distortion parameters of the distortion lens are pre-stored in the memory for the lens parameters, a distortion degree is higher if absolute values of $k_1$ and $k_2$ are greater, and when $k_1$ and $k_2$ are both more than 0, it is indicated that four corners of the image are distorted towards the center.

The distortion parameters are adopted to restore the original distorted image so as to obtain an undistorted image with a large viewing angle and a corresponding video stream. The viewing angle of the corrected image is much larger than a viewing angle of an image obtained by an ordinary lens, so that the problem of blind areas and dead angles of ordinary monitoring may be solved. In addition, the equipment with the distorted image correction restoration device may also be connected with an alarming system, analysis processing is performed on the restored images to judge whether there is an abnormal emergency in the restored images or not, and if an emergency happens and the number of frames where the emergency is recorded continuously exceeds a certain number, that is, the emergency exists in multi-frame images restored, the emergency is captured, that is, the restored images are recorded, and an alarm notice is synchronously sent to implement automatic alarming.

According to the embodiment, correction restoration processing is performed, according to the pre-stored distortion parameters of the distortion lens, on the image acquired by the distortion lens to obtain the undistorted image, so that a displayed picture is approximate to a real scene; and moreover, the restored image has the characteristic of large viewing angle, so that blind areas and dead angles of shooting at an ordinary viewing angle are avoided, capturing of an emergency in a security monitoring environment is facilitated, and security alarming accuracy is improved.

Figure 9:
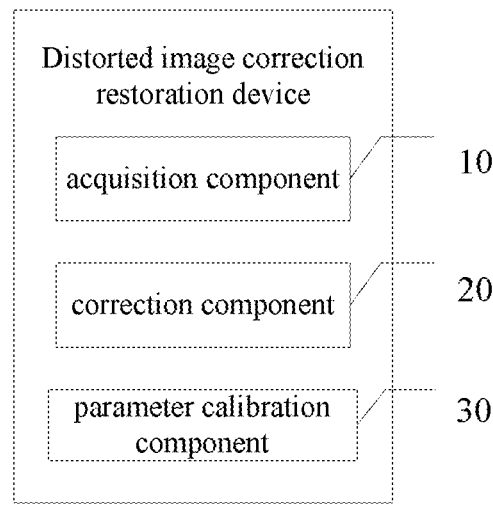
FIG. 9 shows a structure diagram of a device for correction restoration and analysis alarming of the distorted image according to a second embodiment of the disclosure.

FIG. 9 shows a structure diagram of a device for correction restoration and analysis alarming of the distorted image according to a second embodiment of the disclosure. As shown in FIG. 9, a parameter calibration component 30 is added in the embodiment based on the embodiment shown in FIG. 8, and is configured to:

receive a sample image acquired by the distortion lens and a sample image acquired by an ordinary lens;

acquire distorted coordinates ($x_d$, $y_d$) of a calibration characteristic in the sample image acquired by the distortion lens and undistorted coordinates ($x_u$, $y_u$) of a calibration characteristic in the sample image acquired by the ordinary lens; and substitute the distorted coordinates ($x_d$, $y_d$) and the undistorted coordinates ($x_u$, $y_u$) into formula:

$$x_{di} = \frac{x_u}{1 + k_1 r_{i-1}^2 + k_2 r_{i-1}^4},$$

-continued $$y_{di} = \frac{y_u}{1+k_1 r_{i-1}^2 + k_2 r_{i-1}^4},$$

and perform iteration for n times to obtain the distortion parameters ($k_1$, $k_2$), wherein ($x_{di}$, $y_{di}$) are distorted coordinates after ith iteration, $r_{i-1}$ is a radius of the sample image after (i−1)th iteration, and its initial value is $r_0 = \sqrt{x_2^2 + y_u^2}$.

Preferably, the parameter calibration component 30 is further configured to:

perform second-order image graying processing on the sample image acquired by the distortion lens and the sample image acquired by the ordinary lens to obtain a distorted sample grayscale image and an ordinary sample grayscale image respectively;

perform edge detection on the distorted sample grayscale image and the ordinary sample grayscale image to obtain a distorted sample profile diagram and an ordinary sample profile diagram by adopting an edge detection algorithm respectively; and detect the calibration characteristics in the distorted sample profile diagram and the ordinary sample profile diagram to obtain the distorted coordinates ($x_d$, $y_d$) and the undistorted coordinates ($x_u$, $y_u$) by adopting a Hough transform algorithm respectively.

In the embodiment, when the distortion parameters are calibrated, the sample image is preselected, and calibration characteristics are marked in the sample image. For example, in a checker shown in FIG. 12, intersected corners of the checker are marked with solid circles with the same radius, circle center coordinates (x,y,z) calibrated are pre-measured, and circle centers of the solid circles are determined as calibration characteristics of the sample. The sample images are shot by the fisheye lens (i.e. the distortion lens) and the ordinary lens respectively. The fisheye lens and the ordinary lens send the shot sample images to the distorted image correction restoration device.

Identification processing is performed on the calibration characteristics in the sample images acquired by the distortion lens and the ordinary lens. For example, in the checker shown in FIG. 12, the solid circles in the checker are identified, the circle centers of the solid circles are identified, and coordinate values of the circle centers of the solid circles are determined. A table showing corresponding a relationship between sample characteristics is constructed according to a corresponding relationship among practical spatial position coordinates (x,y,z) of a circle center of a sample, distorted coordinates ($x_d$, $y_d$) acquired by the distortion lens and undistorted coordinates ($x_u$, $y_u$) acquired by the ordinary lens, shown as the following table:

| | Attribute | | | | | | |
|---|---|---|---|---|---|---|---|
| | Practical spatial coordinates | | | Undistorted coordinates | | Distorted coordinates | |
| Sequence number | x | y | z | $x_u$ | $y_u$ | $x_d$ | $y_d$ |
| 1 | | | | | | | |
| 2 | | | | | | | |
| ... | | | | | | | |
| N | | | | | | | |

If only radial distortion of the lens is considered in the embodiment, projection coordinates of a distorted calibration characteristic point are ($x_d$, $y_d$).

In the embodiment, the distortion parameters ($k_1$, $k_2$) are calculated by adopting the fisheye effect equation, the image shot by the distortion lens is shown in FIG. 13, the number of iteration times may be preset, and iteration may usually be performed for 5 to 6 times. After iteration is performed for many times, the distortion parameters ($k_1$, $k_2$) may be solved, and the obtained distortion parameters are stored in the memory for the lens parameters.

In the embodiment, the distortion parameters of the distortion lens are obtained by adopting the fisheye effect equation, and when the distorted image is subsequently corrected, the image acquired by the distortion lens is restored through the distortion parameters to obtain the undistorted image, so that the displayed picture is approximate to the real scene, capturing of the emergency in the security monitoring environment is facilitated, and security alarming accuracy is improved.

Preferably, the correction component 20 is further configured to:

substitute the original distorted coordinates ($x_d'$, $y_d'$) and the distortion parameters ($k_1$, $k_2$) into formula:

$$x_{di}' = \frac{x_u'}{1+k_1 r_{i-1}'^2 + k_2 r_{i-1}'^4},$$

$$y_{di}' = \frac{y_u'}{1+k_1 r_{i-1}'^2 + k_2 r_{i-1}'^4},$$

and perform iteration for n' times to obtain the restored coordinates ($x_u'$, $y_u'$), wherein ($x_{di}'$, $y_{di}'$) is original distorted coordinates after ith iteration, $r_{i-1}'$ is a radius of the original distorted image after (i−1)th iteration, and its initial value is $r_0' = \sqrt{x_u'^2 + y_u'^2}$.

In the embodiment, each coordinate point in the original distorted image is corrected to determine the restored coordinates by adopting a reverse process of the fisheye effect equation, the image is reconstructed to obtain the restored image according to the restored coordinates, the restored image is undistorted, and the displayed picture is approximate to the real scene, so that capturing of the emergency in the security monitoring environment is facilitated, and security alarming accuracy is improved.

Preferably, the acquisition component 10 is further configured to acquire direction angles ($\alpha$, $\beta$, $\gamma$) of the distortion lens; and the correction component 20 is further configured to perform spatial position changing on a distorted matrix to obtain restored coordinates ($x_u''$, $y_u''$) corresponding to the direction angles ($\alpha$, $\beta$, $\gamma$) of the distortion lens according to the direction angles ($\alpha$, $\beta$, $\gamma$) of the distortion lens and the restored coordinates ($x_u'$, $y_u'$).

In the embodiment, considering that the coordinates obtained after the image is restored may have an angular offset with practical coordinates when the direction angle of the distortion lens with the pre-stored distortion parameter during calibration of the distortion parameter is inconsistent with a direction angle during practical image acquisition, it is necessary to perform spatial position changing on the distorted matrix to obtain the restored coordinates corresponding to the current direction angle to make the obtained restored image more approximate to the real image, so that reality of the displayed picture and emergency capturing accuracy in the security monitoring environment are further improved.

Preferably, the correction component 20 is further configured to:

substitute the restored coordinates $(x_u', y_u')$ formula:

$$\begin{bmatrix} x_u' \\ y_u' \end{bmatrix} = \frac{f}{z_c} \begin{bmatrix} x_c \\ y_c \end{bmatrix}$$

to obtain lens coordinates $(x_c, y_c, z_c)$, wherein f is an equivalent focal distance of the distortion lens; and substitute the direction angles $(\alpha, \beta, \gamma)$ and lens coordinates $(x_c, y_c, z_c)$ of the distortion lens into formula:

$$\begin{bmatrix} x_c \\ y_c \\ z_c \end{bmatrix} = [\alpha \ \beta \ \lambda] \begin{bmatrix} k_1 & k_2 & k_3 \\ k_4 & k_5 & k_6 \\ k_7 & k_8 & k_9 \end{bmatrix} \begin{bmatrix} x_u'' \\ y_u'' \\ z_u'' \end{bmatrix} + \begin{bmatrix} t_x \\ t_y \\ t_z \end{bmatrix}$$

to obtain the restored) coordinates $(x_u'', y_u'')$ corresponding to the direction angles $(\alpha, \beta, \gamma)$ of the distortion lens to obtain the restored image, wherein $$\begin{bmatrix} k_1 & k_2 & k_3 \\ k_4 & k_5 & k_6 \\ k_7 & k_8 & k_9 \end{bmatrix}$$

is an optical characteristic parameter matrix of the distortion lens, and $$\begin{bmatrix} t_x \\ t_y \\ t_z \end{bmatrix}$$

is a translation vector.

In the embodiment, the coordinates $(x_c, y_c, z_c)$ are obtained by a reverse process of perspective transform, and the coordinates are coordinate values before perspective transform. According to a mathematical model of a space imaging system, restored coordinates $(x_u'', y_u'', z_u'')$ are mapped into the coordinates $(x_c, y_c, z_c)$ before perspective transform after rotation and translation transform, so that the restored coordinates $(x_u'', y_u'', z_u'')$ corresponding to the direction angles $(\alpha, \beta, \gamma)$ of the distortion lens may be obtained by the reverse process. In the embodiment, it is supposed that only radial distortion of the lens is considered, so that $z_u''$ may be 0, the restored coordinates $(x_u'', y_u'')$ are finally obtained, and the image is reconstructed to obtain the restored image according to the coordinates.

In the embodiment, spatial position changing is performed on the distorted matrix to obtain the restored coordinates corresponding to the current direction angles to make the obtained restored image more approximate to the real image, so that reality of the displayed picture and emergency capturing accuracy in the security monitoring environment are further improved.

Figure 10:
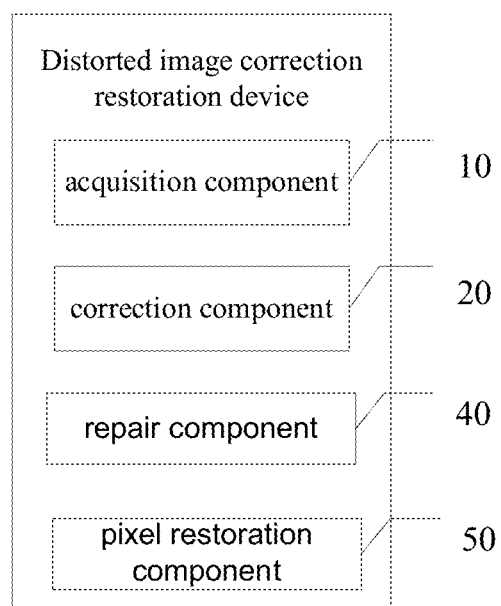
FIG. 10 shows a structure diagram of a device for correction restoration and analysis alarming of the distorted image according to a second embodiment of the disclosure.

FIG. 10 is a structure diagram of a device for correction restoration and analysis alarming of the distorted image according to a second embodiment of the disclosure. As shown in FIG. 10, the following components are added in the embodiment based on the embodiment shown in FIG. 8:

a repair component configured to repair hole coordinate points in the restored image by adopting an interpolation algorithm; and a pixel restoration component 50 configured to restore pixels of the original distorted coordinates to the restored coordinates according to corresponding relationships between original distorted coordinates of the original distorted image and restored coordinates of the restored image.

In the embodiment, there may exist some black grids, which may be called holes, in the restored image after distortion correction, as shown in FIG. 14. For finally obtaining a complete image, the holes are required to be repaired, and the holes are repaired to restore an undistorted large-viewing-angle image by adopting the interpolation algorithm, as shown in FIG. 15.

In addition, a color image is originally obtained during image shooting, the color image is converted into a grayscale image to extract the original distorted coordinates, and it is necessary to perform color restoration to restore the pixels of the original distorted coordinates to the restored coordinates to finally obtain the color-restored image, so that capturing of the emergency in the security monitoring environment is facilitated, and alarming accuracy is further improved.

Figure 11:
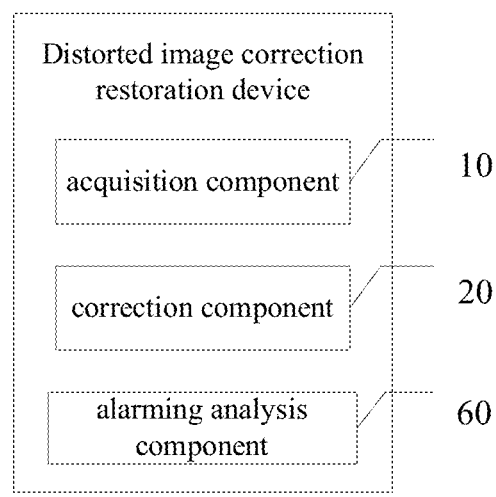
FIG. 11 shows a structure diagram of a device for correction restoration and analysis alarming of the distorted image according to a third embodiment of the disclosure.

FIG. 11 shows a structure diagram of a device for correction restoration and analysis alarming of the distorted image according to a third embodiment of the disclosure, and as shown in FIG. 11, an alarming analysis component 60 is added in the embodiment based on the embodiment shown in FIG. 8, and is configured to:

perform adaptive background learning on multiple frames of the restored image to obtain a reference background;

perform segmentation processing on the subsequent restored image according to the reference background by adopting an image segmentation algorithm, and extract a different target characteristic;

perform filtering processing on the different target characteristic to exclude the restored image of which the different target characteristic is within a filtering range;

perform motion matching tracking of the different target characteristic on the subsequent restored image by adopting the different target characteristic out of the filtering range; and when the number of the restored images with the different target characteristic exceeds a preset frame number, the restored images are recorded as images with a sudden change, and an alarm is given.

In the embodiment, adaptive background learning is performed on multi-frame image restored and video, and the reference background without any emergency is extracted. Adaptive background learning may be reference background extraction over the first n-frame images within a time period. For example, for the images during the first hour, i.e. the images within 0-60 minutes, adaptive learning is performed on the images during the first 0-5 minutes to extract the reference background, then the reference background is compared with the images during the 6th-60th minutes; for the images during the second hour, i.e. 60-120 minutes, adaptive learning is performed on the image during 60th-65th minutes to extract the reference background, then the reference background is compared with the images during the 66th-120th minutes, and so on.

When the reference background is compared with the subsequent images for analysis, a background image the same as or similar to the reference background and a foreground image greatly different from the reference background are segmented by adopting the image segmentation algorithm, and the different target characteristic is extracted from the foreground image. For example, there is one more person in a certain subsequent image compared with the reference background, and an image of the person is determined as a different target characteristic; and for another example, there is a box in the reference background, there is no box in a certain subsequent image, and then a position where the box is placed is determined as a different target characteristic.

In consideration of influence of video noise caused by light and shadow or signal acquisition, the filtering range is preset to filter the different target characteristic caused by noise to exclude the image which is differentiated by noise. For the different target characteristic out of the filtering range, it may be an emergency, and the subsequent image is matched and tracked to judge whether the different target characteristic still exists in the subsequent image or not. For example, an image of a person appears on a right side of the ith-frame image, motion matching tracking is performed on the image of the person in each image within a certain time period, and the image of the person gradually moves leftwards. For another example, there is a box in middle of the first to (i−1)th-frame images, there is no box in the ith-frame image, there is no box all the time in each image within a certain time period, or a position of the box changes in the ith-frame image, and the box continuously moves in each image within the time period.

In order to exclude some accidental interference conditions, for example, a person passes by in a monitoring range, an image of the person may not exist for a long time in a video picture, and may fast move out of the picture within a specified time length, the number of frames within 2 seconds is determined as the preset frame number if the image of the person exists in the video picture for 2 seconds when the person passes by, it is determined as a normal condition and alarming is not required if the image of the person appears within the preset frame number, and if the image of the person continuously appears out of a range of the preset frame number, it is indicated that the person appears for long in a monitoring area, there may be an abnormity and alarming is required. For another example, a box suddenly disappears from the monitoring range, if the box reappears in the image after 0.5 second, accidental interference is determined and alarming is not required, and if the box does not appear for more than 5 seconds, it may be considered as an abnormity, and an alarm notice is required to be sent to implement automatic alarming.

According to the embodiment, an intelligent analysis alarming object is the corrected and restored image of the distorted image acquired by the fisheye lens, and the image has the characteristic of large viewing angle compared with the image acquired by the ordinary lens, so that the problem of blind areas and dead angles of ordinary monitoring may be solved, capturing of the emergency in the security monitoring environment is facilitated, and security alarming accuracy is improved.

The above is only the preferred embodiment of the disclosure and not thus intended to limit the scope of the disclosure. All equivalent structure or equivalent flow transformations made by virtue of contents of the Specification and drawings of the disclosure or direct or indirect application of the contents to the other related technical fields shall fall within the scope of protection of the disclosure.

INDUSTRIAL APPLICABILITY

As mentioned above, the method for correction restoration and analysis alarming of the distorted image and device provided by the embodiment of the disclosure have the following beneficial effects: according to the embodiment, the intelligent analysis alarming object is the corrected and restored image of the distorted image acquired by the fisheye lens, and the image has the characteristic of large viewing angle compared with the image acquired by the ordinary lens, so that the problem of blind areas and dead angles of ordinary monitoring may be solved, capturing of the emergency in the security monitoring environment is facilitated, and security alarming accuracy is improved.

What is claimed is:

1. A method for correction restoration and analysis alarming of a distorted image, comprising:
   receiving an original distorted image acquired by a distortion lens, and acquiring original distorted coordinates $(x_d', y_d')$ of each coordinate point in the original distorted image; and
   acquiring pre-stored distortion parameters $(k_1, k_2)$ of the distortion lens, and determining restored coordinates $(x_u', y_u')$ of the each coordinate point in the original distorted image to obtain a restored image;
   wherein after the restored coordinates $(x_u', y_u')$ of each coordinate point in the original distorted image are determined, the method further comprises:
   acquiring direction angles $(\alpha, \beta, \gamma)$ of the distortion lens; and
   performing spatial position changing on a distorted matrix to obtain restored coordinates $(x_u'', y_u'')$ corresponding to the direction angles $(\alpha, \beta, \gamma)$ of the distortion lens according to the direction angles $(\alpha, \beta, \gamma)$ of the distortion lens and the restored coordinates $(x_u', y_u')$.

2. The method for correction restoration and analysis alarming of the distorted image according to claim 1, wherein calibrating the distortion parameters $(k_1, k_2)$ of the distortion lens comprises:
   receiving a sample image acquired by the distortion lens and a sample image acquired by an ordinary lens;
   acquiring distorted coordinates $(x_d, y_d)$ of a calibration characteristic in the sample image acquired by the distortion lens and undistorted coordinates $(x_u, y_u)$ of a calibration characteristic in the sample image acquired by the ordinary lens; and
   substituting the distorted coordinates $(x_d, y_d)$ and the undistorted coordinates $(x_u, y_u)$ into formula:

$$x_{di} = \frac{x_u}{1 + k_1 r_{i-1}^2 + k_2 r_{i-1}^4},$$

$$y_{di} = \frac{y_u}{1 + k_1 r_{i-1}^2 + k_2 r_{i-1}^4},$$

and performing iteration for n times to obtain the distortion parameters $(k_1, k_2)$, wherein $(x_{di}, y_{di})$ are distorted coordinates after ith iteration, $r_{i-1}$ is a radius of the sample image after (i−1)th iteration, and an initial value is $r_0 = \sqrt{x_u^2 + y_u^2}$.

3. The method for correction restoration and analysis alarming of the distorted image according to claim 2, wherein acquiring the distorted coordinates $(x_d, y_d)$ of the calibration characteristic in the sample image acquired by the distortion lens and the undistorted coordinates $(x_u, y_u)$ of the calibration characteristic in the sample image acquired by the ordinary lens comprises:
   performing second-order image graying processing on the sample image acquired by the distortion lens and the sample image acquired by the ordinary lens to obtain a distorted sample grayscale image and an ordinary sample grayscale image respectively;

performing edge detection on the distorted sample grayscale image and the ordinary sample grayscale image to obtain a distorted sample profile diagram and an ordinary sample profile diagram by adopting an edge detection algorithm respectively; and detecting the calibration characteristics in the distorted sample profile diagram and the ordinary sample profile diagram to obtain the distorted coordinates $(x_d, y_d)$ and the undistorted coordinates $(x_u, y_u)$ by adopting a Hough transform algorithm respectively.

4. The method for correction restoration and analysis alarming of the distorted image according to claim 1, wherein the determining the restored coordinates $(x_u', y_u')$ of each coordinate point in the original distorted image comprises:

substituting the original distorted coordinates $(x_d', y_d')$ and the distortion parameters $(k_1, k_2)$ into formula:

$$x'_{di} = \frac{x'_u}{1 + k_1 r'^2_{i-1} + k_2 r'^4_{i-1}},$$

$$y'_{di} = \frac{y_u}{1 + k_1 r'^2_{i-1} + k_2 r'^4_{i-1}},$$

and performing iteration for n' times to obtain the restored coordinates $(x_u', y_u')$, wherein $(x_{di}', y_{di}')$ are original distorted coordinates after ith iteration, $r_{i-1}'$ is a radius of the original distorted image after (i−1)th iteration, and an initial value is $r_0' = \sqrt{x_u'^2 + y_u'^2}$.

5. The method for correction restoration and analysis alarming of the distorted image according to claim 1, wherein the performing the spatial position changing on the distorted matrix to obtain the restored coordinates $(x_u'', y_u'')$ corresponding to the direction angles $(\alpha, \beta, \gamma)$ of the distortion lens according to the direction angles $(\alpha, \beta, \gamma)$ of the distortion lens and the restored coordinates $(x_u', y_u')$ comprises:

substituting the restored coordinates $(x_u', y_u')$ into formula:

$$\begin{bmatrix} x'_u \\ y'_u \end{bmatrix} = \frac{f}{z_c} \begin{bmatrix} x_c \\ y_c \end{bmatrix}$$

to obtain lens coordinates $(x_c, y_c, z_c)$, wherein f is an equivalent focal distance of the distortion lens; and substituting the direction angles $(\alpha, \beta, \gamma)$ and lens coordinates $(x_c, y_c, z_c)$ of the distortion lens into formula:

$$\begin{bmatrix} x_c \\ y_c \\ z_c \end{bmatrix} = \begin{bmatrix} \alpha & \beta & \lambda \end{bmatrix} \begin{bmatrix} k_1 & k_2 & k_3 \\ k_4 & k_5 & k_6 \\ k_7 & k_8 & k_9 \end{bmatrix} \begin{bmatrix} x''_u \\ y''_u \\ z''_u \end{bmatrix} + \begin{bmatrix} t_x \\ t_y \\ t_z \end{bmatrix}$$

to obtain the restored coordinates $(x_u'', y_u'')$ corresponding to the direction angles $(\alpha, \beta, \gamma)$ of the distortion lens, wherein $$\begin{bmatrix} k_1 & k_2 & k_3 \\ k_4 & k_5 & k_6 \\ k_7 & k_8 & k_9 \end{bmatrix}$$

is an optical characteristic parameter matrix of the distortion lens, and $$\begin{bmatrix} t_x \\ t_y \\ t_z \end{bmatrix}$$

is a translation vector.

6. The method for correction restoration and analysis alarming of the distorted image according to claim 1, wherein after the pre-stored distortion parameters $(k_1, k_2)$ of the distortion lens are acquired and the restored coordinates $(x_u', y_u')$ of each coordinate point in the original distorted image are determined to obtain the restored image, the method further comprises:

repairing hole coordinate points in the restored image by adopting an interpolation algorithm; and restoring pixels of the original distorted coordinates to the restored coordinates according to corresponding relationships between the original distorted coordinates of the original distorted image and the restored coordinates of the restored image.

7. A device for correction restoration and analysis alarming of a distorted image, comprising: a hardware processor, configured to perform programming components stored in a memory, wherein the programming components comprise:

an acquisition component configured to receive an original distorted image acquired by a distortion lens, and acquire original distorted coordinates $(x_d', y_d')$ of each coordinate point in the original distorted image; and a correction component configured to acquire pre-stored distortion parameters $(k_1, k_2)$ of the distortion lens, and determine restored coordinates $(x_u', y_u')$ of the each coordinate point in the original distorted image to obtain a restored image;

wherein the acquisition component is further configured to acquire direction angles $(\alpha, \beta, \gamma)$ of the distortion lens; and the correction component is further configured to perform spatial position changing on a distorted matrix to obtain restored coordinates $(x_u'', y_u'')$ corresponding to the direction angles $(\alpha, \beta, \gamma)$ of the distortion lens according to the direction angles $(\alpha, \beta, \gamma)$ of the distortion lens and the restored coordinates $(x_u', y_u')$.

8. The device for correction restoration and analysis alarming of the distorted image according to claim 7, further comprising a parameter calibration component configured to receive a sample image acquired by the distortion lens and a sample image acquired by an ordinary lens;

acquire distorted coordinates $(x_d, y_d)$ of a calibration characteristic in the sample image acquired by the distortion lens and undistorted coordinates $(x_u, y_u)$ of a calibration characteristic in the sample image acquired by the ordinary lens; and substitute the distorted coordinates $(x_d, y_d)$ and the undistorted coordinates $(x_u, y_u)$ into formula:

$$x_{di} = \frac{x_u}{1 + k_1 r^2_{i-1} + k_2 r^4_{i-1}},$$

$$y_{di} = \frac{y_u}{1 + k_1 r^2_{i-1} + k_2 r^4_{i-1}},$$

and perform iteration for n times to obtain the distortion parameters ($k_1$, $k_2$), wherein ($x_{di}$, $y_{di}$) are distorted coordinates after ith iteration, $r_{i-1}$ is a radius of the sample image after (i−1)th iteration, and an initial value is $r_0 = \sqrt{x_u^2 + y_u^2}$.

9. The device for correction restoration and analysis alarming of the distorted image according to claim 8, wherein the parameter calibration component is further configured to:
- perform second-order image graying processing on the sample image acquired by the distortion lens and the sample image acquired by the ordinary lens to obtain a distorted sample grayscale image and an ordinary sample grayscale image respectively;
- perform edge detection on the distorted sample grayscale image and the ordinary sample grayscale image to obtain a distorted sample profile diagram and an ordinary sample profile diagram by adopting an edge detection algorithm respectively; and
- detect the calibration characteristics in the distorted sample profile diagram and the ordinary sample profile diagram to obtain the distorted coordinates ($x_d$, $y_d$) and the undistorted coordinates ($x_u$, $y_u$) by adopting a Hough transform algorithm respectively.

10. The device for correction restoration and analysis alarming of the distorted image according to claim 7, wherein the correction component is further configured to:
substitute the original distorted coordinates ($x_d'$, $y_d'$) and the distortion parameters ($k_1$, $k_2$) into formula:

$$x'_{di} = \frac{x'_u}{1 + k_1 r'^2_{i-1} + k_2 r'^4_{i-1}},$$

$$y'_{di} = \frac{y'_u}{1 + k_1 r'^2_{i-1} + k_2 r'^4_{i-1}},$$

and perform iteration for n' times to obtain the restored coordinates ($x_u'$, $y_u'$), wherein ($x_{di}'$, $y_{di}'$) are original distorted coordinates after ith iteration, $r_{i-1}'$ is a radius of the original distorted image after (i−1)th iteration, and an initial value is $r_0' = \sqrt{x_u'^2 + y_u'^2}$.

11. The device for correction restoration and analysis alarming of the distorted image according to claim 7, wherein the correction component is further configured to
substitute the restored coordinates ($x_u'$, $y_u'$) into formula:

$$\begin{bmatrix} x'_u \\ y'_u \end{bmatrix} = \frac{f}{z_c} \begin{bmatrix} x_c \\ y_c \end{bmatrix}$$

to obtain lens coordinates ($x_c$, $y_c$, $z_c$), wherein f is an equivalent focal distance of the distortion lens; and
substitute the direction angles (α, β, γ) and lens coordinates ($x_c$, $y_c$, $z_c$) of the distortion lens into formula:

$$\begin{bmatrix} x_c \\ y_c \\ z_c \end{bmatrix} = [\alpha\ \beta\ \lambda] \begin{bmatrix} k_1 & k_2 & k_3 \\ k_4 & k_5 & k_6 \\ k_7 & k_8 & k_9 \end{bmatrix} \begin{bmatrix} x''_u \\ y''_u \\ z''_u \end{bmatrix} + \begin{bmatrix} t_x \\ t_y \\ t_z \end{bmatrix}$$

to obtain the restored coordinates ($x_u''$, $y_u''$) corresponding to the direction angles (α, β, γ) of the distortion lens, wherein $$\begin{bmatrix} k_1 & k_2 & k_3 \\ k_4 & k_5 & k_6 \\ k_7 & k_8 & k_9 \end{bmatrix}$$

is an optical characteristic parameter matrix of the distortion lens, and $$\begin{bmatrix} t_x \\ t_y \\ t_z \end{bmatrix}$$

is a translation vector.

12. The device for correction restoration and analysis alarming of the distorted image according to claim 7, wherein the programming components further comprise:
- a repair component configured to repair hole coordinate points in the restored image by adopting an interpolation algorithm; and
- a pixel restoration component configured to restore pixels of the original distorted coordinates to the restored coordinates according to corresponding relationships between the original distorted coordinates of the original distorted image and the restored coordinates of the restored image.

13. The method for correction restoration and analysis alarming of the distorted image according to claim 1, wherein after the pre-stored distortion parameters ($k_1$, $k_2$) of the distortion lens are acquired and the restored coordinates ($x_u'$, $y_u'$) of each coordinate point in the original distorted image are determined to obtain the restored image, the method further comprises:
- performing adaptive background learning on multi-frame images restored to obtain a reference background;
- performing segmentation processing on subsequent restored images according to the reference background by adopting an image segmentation algorithm, and extracting a different target characteristic;
- performing filtering processing on the different target characteristic to exclude a restored image of which the different target characteristic is within a filtering range;
- performing motion matching tracking of the different target characteristic on the subsequent restored images by adopting the different target characteristic out of the filtering range; and
- when the number of restored images with the different target characteristic exceeds a preset frame number, recording the restored images as images with a sudden change, and giving an alarm.

14. The device for correction restoration and analysis alarming of the distorted image according to claim 7, further comprising an alarming analysis component configured to
- perform adaptive background learning on multi-frame images restored to obtain a reference background;
- perform segmentation processing on subsequent restored images according to the reference background by adopting an image segmentation algorithm, and extract a different target characteristic;
- perform filtering processing on the different target characteristic to exclude a restored image of which the different target characteristic is within a filtering range;
- perform motion matching tracking of the different target characteristic on the subsequent restored images by adopting the different target characteristic out of the filtering range; and when the number of restored images with the different target characteristic exceeds a preset frame number, records the restored images as images with a sudden change, and give an alarm.

15. The method for correction restoration and analysis alarming of the distorted image according to claim 2, wherein after the pre-stored distortion parameters ($k_1$, $k_2$) of the distortion lens are acquired and the restored coordinates ($x_u'$, $y_u'$) of each coordinate point in the original distorted image are determined to obtain the restored image, the method further comprises:

performing adaptive background learning on multi-frame images restored to obtain a reference background;

performing segmentation processing on subsequent restored images according to the reference background by adopting an image segmentation algorithm, and extracting a different target characteristic;

performing filtering processing on the different target characteristic to exclude a restored image of which the different target characteristic is within a filtering range;

performing motion matching tracking of the different target characteristic on the subsequent restored images by adopting the different target characteristic out of the filtering range; and when the number of restored images with the different target characteristic exceeds a preset frame number, recording the restored images as images with a sudden change, and giving an alarm.

16. The method for correction restoration and analysis alarming of the distorted image according to claim 3, wherein after the pre-stored distortion parameters ($k_1$, $k_2$) of the distortion lens are acquired and the restored coordinates ($x_u'$, $y_u'$) of each coordinate point in the original distorted image are determined to obtain the restored image, the method further comprises:

performing adaptive background learning on multi-frame images restored to obtain a reference background;

performing segmentation processing on subsequent restored images according to the reference background by adopting an image segmentation algorithm, and extracting a different target characteristic;

performing filtering processing on the different target characteristic to exclude a restored image of which the different target characteristic is within a filtering range;

performing motion matching tracking of the different target characteristic on the subsequent restored images by adopting the different target characteristic out of the filtering range; and when the number of restored images with the different target characteristic exceeds a preset frame number, recording the restored images as images with a sudden change, and giving an alarm.

17. The method for correction restoration and analysis alarming of the distorted image according to claim 4, wherein after the pre-stored distortion parameters ($k_1$, $k_2$) of the distortion lens are acquired and the restored coordinates ($x_u'$, $y_u'$) of each coordinate point in the original distorted image are determined to obtain the restored image, the method further comprises:

performing adaptive background learning on multi-frame images restored to obtain a reference background;

performing segmentation processing on subsequent restored images according to the reference background by adopting an image segmentation algorithm, and extracting a different target characteristic;

performing filtering processing on the different target characteristic to exclude a restored image of which the different target characteristic is within a filtering range;

performing motion matching tracking of the different target characteristic on the subsequent restored images by adopting the different target characteristic out of the filtering range; and when the number of restored images with the different target characteristic exceeds a preset frame number, recording the restored images as images with a sudden change, and giving an alarm.

* * * * *